United States Patent
Schaller et al.

(10) Patent No.: US 6,325,922 B1
(45) Date of Patent: Dec. 4, 2001

(54) FILTER DEVICE FOR CLEANING PLASTICS MELTS

(75) Inventors: Rainer Schaller, Wertingen; Eduard Lindner, Heretsried; Ralf Henke, Gründau; Detlef Gneuss, Bad Oeynhausen, all of (DE)

(73) Assignee: Arteva Technologies S.A.R.L., Zurich (CH)

( * ) Notice: Subject to any disclaimer, the term of this patent is extended or adjusted under 35 U.S.C. 154(b) by 0 days.

(21) Appl. No.: 09/568,246

(22) Filed: May 9, 2000

(30) Foreign Application Priority Data

May 18, 1999 (DE) .......................................... 299 08 735 U

(51) Int. Cl.[7] .................................................. B01D 29/66
(52) U.S. Cl. ..................... 210/90; 210/107; 210/333.1; 210/412; 425/197; 425/199
(58) Field of Search ..................... 425/197, 199, 425/198; 210/107, 108, 109, 110, 134, 137, 184, 186, 333.01, 333.1, 409, 411, 412, 714, 90, 97, 143

(56) References Cited

U.S. PATENT DOCUMENTS

| 5,090,887 | 2/1992 | Gneuss . | |
|---|---|---|---|
| 5,141,631 | * 8/1992 | Whitman | 210/108 |
| 5,449,458 | 9/1995 | Gneuss | 210/330 |
| 5,536,399 | 7/1996 | Kaneshige . | |
| 5,922,194 | * 7/1999 | Bruckman et al. | 210/90 |

FOREIGN PATENT DOCUMENTS

| 41 13 501 | 10/1992 | (DE) . |
| 08 156 072 | 6/1996 | (JP) . |

OTHER PUBLICATIONS

DE 42 12 928: Oct. 28, 1993; Abstract.
"Problem solutions for all fields of application"; PV International Plastic Magazine, vol. 3 No. 2, (1992).

* cited by examiner

*Primary Examiner*—Joseph W. Drodge
(74) *Attorney, Agent, or Firm*—Foley & Lardner

(57) ABSTRACT

A filter device for filtering plastic melts includes a filter wheel having cavities which are covered by screening elements. A pressure sensor is provided in a melt inflow line upstream of the filter wheel. A pressure sensor is also provided in a melt outflow line downstream of the filter wheel. The pressure sensors measure the pressure drop across the filter. The melt inflow and outflow lines are connected to a melt channel in the filter device, respectively. A melt return line is in connection via a pump and a discharge line with a backflushing slot. The discharge line is connected to an accelerator for increasing pressure in surges. A further melt return/discharge line is connected via a 3-way valve and a return line to the melt inflow line or to a disposal line.

22 Claims, 4 Drawing Sheets

FILTER DEVICE FOR CLEANING PLASTICS MELTS

BACKGROUND OF THE INVENTION

1. Field of the Invention

The invention relates to a filter device for cleaning plastics (polymer) melts having a filter wheel for pivoting screening elements in and out of a melt channel through which the plastics melt flows in the filter device. The screening elements cover cavities arranged in the filter wheel and are exchangeable for fresh or cleaned screening elements at a removal/fitting opening of the filter device.

2. Description of the Related Art

German Patent Publication No. 42 12 928 A1 discloses a filter device where the individual screening elements include a number of filter cells arranged one above the other and which are operated parallel to one another. The filter cells are formed by two annular filter disks. The inner zones of the filter disks are connected to an interposed ring, which has radial passages, and the outer zones of the filter disks are connected to each other. The filter disks are formed by a multi-layer construction and have at least one filter layer and a supporting layer carrying the filter layer.

German Patent Publication No. 41 13 501 A1 relates to screening elements present in the openings of a rocker arm or a disk which, by pivoting or turning of the arm or disk, can be brought both into an operable position and into a removal position. Used elements can be replaced in the removal position by screening elements having new or cleaned filter areas.

A continuously operating filter system described in German Patent Publication No. 42 12 928 A1 employs a filter wheel through which a monomer melt flows eccentrically in a filter housing. The filter housing is fitted with screening elements or filter inserts which are arranged along a circle. The small pore widths of the filter inserts have a high cleaning effect, where the quality of the end product is improved. The filter wheel is equipped on the outer circumference with a toothed rim, which is engaged by a pinion. The pinion is connected via a lever to a drive piston, the movement of which is controlled by a hydraulic control system. The hydraulic device simultaneously serves for driving a backflushing piston (accelerator) for back-thrust cleaning of the filter cells with the screening elements and for driving a discharge piston. In the case of backflushing, the discharge piston channels the monomer to the outside and, in the case of normal operation, the discharge piston returns the monomer to the main melt line. The accelerator produces the required melt flow, briefly at a high rate, to backflush with the necessary pressure.

However, due to the high temperatures during operation, oxidation of the monomer or polymer of the plastics melt can easily occur during a filter change. Furthermore, it is not possible to blow a gas into the filter housing to reduce the risk of oxidation during the filter change, because cooling the filter wheel and screening elements could cause the plastics melt to solidify. This would inevitably lead to leaking or destruction of the filters. The high temperatures of the filter housing also have the effect of heating all the built-on parts so that their serviceability is no longer ensured. In this case, overloading of the drive elements, such as, for example, the drive piston, may also occur. The low mechanical support of the overall filter system is also problematical in the thrust-like backflow cleaning of the screening elements.

SUMMARY OF THE INVENTION

It is therefore an object of the present invention to overcome the drawbacks of the prior art and to provide an improved filter device.

It is further an object of the invention to provide a filter device in which the risk of oxidation during the change of a screening element is diminished.

It is furthermore an object of the invention to provide a filter device in which damage to the filter device caused by excessive pressure fluctuations as well as impairments in the quality of the filtered product caused by high operating temperatures are largely avoided.

In accomplishing the foregoing objects, there has been provided according to the present invention a filter device for filtering plastics melts, comprising: a melt channel through which a plastics melt flows; an exchanging area; a filter wheel having a plurality of cavities therein, wherein the filter wheel pivots the plurality of cavities between the melt channel and the exchanging area; a plurality of screening elements covering the cavities in the filter wheel; a melt inflow line upstream of the filter wheel and a melt outflow line downstream of the filter wheel in fluid communication with the melt channel; a first pressure sensor arranged in the melt inflow line; a second pressure sensor arranged in the melt outflow line; a removal/fitting opening formed in the exchanging area of the filter device for exchanging fresh or cleaned screening elements for soiled screening elements; a melt return line which branches off from the melt outflow line and includes a pump and a first melt discharge line for transporting filtered plastics melt into a backflushing slot of the filter device to backflush the screening elements; an accelerator connected to the first melt discharge line for increasing pressure in the first melt discharge line for backflushing the screening elements; and a second melt return/discharge line, leading away from the filter device on the opposite side of the filter wheel from the backflushing slot, and a valve for selectively directing backflushed plastics to the melt inflow line or a disposal line.

Further objects, features and advantages of the invention will become apparent from the following detailed description of the preferred embodiments of the invention, when considered together with the accompanying figures of drawing.

BRIEF DESCRIPTION OF THE DRAWINGS

In the drawings:

FIG. 1a illustrates a filter wheel in section taken along the line A–A' of FIG. 1.

DETAILED DESCRIPTION OF PREFERRED EMBODIMENTS

Figure 1:
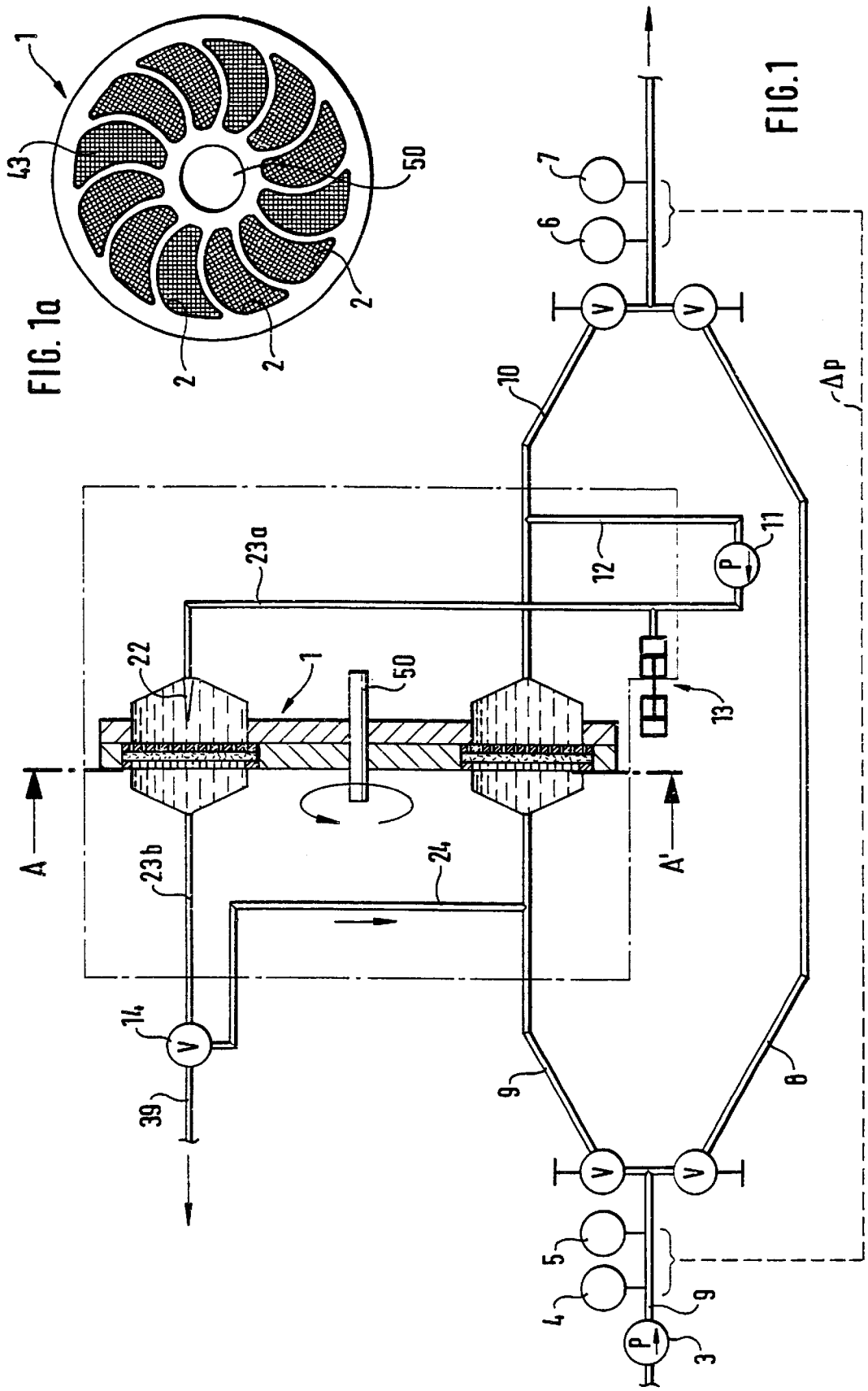
FIG. 1 illustrates a schematic flow diagram of the filter apparatus according to the present invention.

The filter device of the invention for filtering plastics melts which includes a melt channel through which a plastics melt flows, an exchanging area, a filter wheel having a plurality of cavities therein, wherein the filter wheel pivots the plurality of cavities between the melt channel and the exchanging area. The device further includes a plurality of screening elements covering the cavities in the filter wheel, a melt inflow line and a melt outflow line in fluid communication with the melt channel, a first pressure sensor arranged in the melt inflow line upstream of the filter wheel, and a second pressure sensor arranged in the melt outflow line downstream of the filter wheel. The filter device also includes a removal/fitting opening formed in the filter device for exchanging fresh or cleaned screening elements for soiled screening elements.

In a further aspect of the invention, the filter device includes a melt return line which branches off from the melt outflow line and opens out via a pump and a first melt discharge line into a backflushing slot to backflush the screening elements. In another aspect of the invention, the filter device further includes an accelerator connected to the first melt discharge line for increasing pressure in the first melt discharge line for backflushing the screening elements. In another aspect of the invention, the device includes a second melt return/discharge line, leading away from the filter device, which is connected by a 3-way valve to the melt inflow line and a disposal line.

In yet another aspect of the present invention, the filter device is formed from a first block and a second block, which are kept at a distance by spacer plates arranged in between the blocks, and wherein the cleaning/exchanging area is formed in the first block. In another aspect, a removal/fitting opening for the screening elements is formed in the cleaning/exchanging area, the opening being closed by a displacement block which can be moved into and out of the removal/fitting opening by a manually actuable spindle.

In a further embodiment of the invention, the device includes T-shaped feed nozzles having nozzle holes distributed around the circumference thereof and arranged above a longitudinal and transverse edge of the removal/fitting opening, the nozzles being aligned in such a way that gas flowing out of the nozzles forms two overlapping gas veils, which extend at right angles with respect to each other and flow away via the removal/fitting opening without gas flowing into this opening.

In a further aspect of the present invention, the filter device further includes a drive piston connected via a rocker and a pulling/pushing rod to a ratchet, which drives a pinion which meshes with a toothed rim on the outer circumference of the filter wheel.

In yet another aspect of the present invention, the screening element includes a plurality of filter layers such as, for example, five layers, preferably having two outer filter layers which have a greater mesh size than the inner filter layers. The filter layers fabric may be compressed together and sealed at the outer edge to form an edge compression. In a further aspect of the invention, the filter device includes a wall plate having honeycomb-shaped openings is arranged upstream the screening elements in the direction of flushing and a woven fabric.

The further development of a known filter device for the online filteration of plastics melts comprising monomers achieves the advantage that the degree of contamination is significantly lower than in the prior art and that improved properties of the end product are obtained as a result.

In the following detailed description, the preferred embodiments are described in sufficient detail to enable those skilled in the art to practice the invention, and it is to be understood that other embodiments may be utilized, and that changes may be made without departing from the spirit and scope of the present invention.

Reference is made to FIG. 1 which shows a flow diagram of a filter device according to the present invention. The filter device includes a filter wheel 1 which turns counter-clockwise about a central spindle 50. Pressure sensors 4, 5, which measure the melt pressure upstream of the filter device, are arranged in a melt inflow line 9. A pump 3, which may be, for example, a gear pump, forces the plastics melt through the melt inflow line 9 into the filter device. The melt enters a charging funnel, passes through a screening element, collects in a collecting funnel, and is then discharged via melt outflow line 10. Pressure sensors 6 and 7 are located along the melt outflow line 10. Pressure sensors 6 and 7, like pressure sensors 4 and 5, are preferably provided in duplicate for additional safety. The pressure sensors 6 and 7 determine the pressure of the plastics melt downstream of the filter device. The pressure measurements of the sensors 4 and 5, on the one hand, and the sensors 6 and 7, on the other hand, are used to determine a pressure difference $\Delta p$. As long as this pressure difference, $\Delta p$, does not exceed a predetermined value, a portion of the plastics melt is discharged from melt outflow line 10 via a melt return line 12 back into the filter device. When the pressure difference, $\Delta p$, exceeds a predetermined value, i.e. the pressure differential is too great—indicating that the screening elements are largely clogged and are causing the high pressure loss—a backflushing of the screening elements of the filter device is initiated, as described in greater detail below. If the screening elements of the filter device are completely clogged, a bypass line 8 is opened to transport the plastics melt past the filter device.

Melt return line 12 includes a pump 11, which may be, for example, a gear pump, to transport the plastics melt into discharge line 23a. An accelerator 13 is connected to the discharge line 23a for backflushing the screening elements of the filter device. The discharge line 23a opens out into a backflushing slot 22. When the accelerator 13 is activated, the pressure in the discharge line 23a is increased. The pressure in discharge line 23a is additionally boosted by the shape of the backflushing slot 22. High pressure during backflushing causes the contaminants lodged in the screening elements to be flushed out and passed via an opposite slot into a melt return/discharge line 23b to a 3-way valve 14, which may be melt discharge valve. If the predetermined value for the pressure difference, $\Delta p$, is not exceeded, the plastics melt is returned through the 3-way valve via return line 24 to melt inflow line 9. If the predetermined value for the pressure difference, $\Delta p$, is exceeded, the 3-way valve 14 channels the plastics melt away via disposal line 39.

During operation, the screening elements of the filter device become clogged by the contaminants deposited from the plastics melt, so that the average resistance through the screening elements increases. As will be described in more detail below, the screening elements cover the cavities 2 formed in the filter wheel 1. A plurality of cavities are usually in contact with the melt flow. The number of cavities that are in contact with the melt flow will depend upon the desired filtering characteristics. Preferably, there are three cavities 2 that are in effective contact with the melt channel 44 at any one time. The filter wheel 1 is turned step-by-step during operation to exchange filter elements in contact with the melt flow as discussed in more detail below. Of the three cavities in the effective position, two continue to be in connection with the melt channel 44 (see FIG. 3), albeit in a changed position, while a fresh screening element is added. Consequently, after rotation of the filter wheel 1, there are two screening elements with partially clogged filter areas and one screening element with a free filter area simultaneously in connection with the melt channel 44, and connected virtually in parallel. Thus the pressure drop across the screening elements when the plastics melt flows through the screening elements does not fluctuate as it would, for example, when a completely clogged screening element is exchanged for a fresh screening element.

FIG. 1 schematically illustrates two positions of the screening elements. There is shown a lower position of the screening elements, where the screening elements are in connection with the melt channel and filter out contaminants from the plastics melt, and an upper position of screening elements for backflushing.

FIG. 1a shows a section along the line A–A' of FIG. 1. In the plan view of the filter wheel 1, the kidney-shaped screening elements 43, which cover the cavities 2 lying under them, are shown. While the screening elements 43 and cavities 2 are shown as being kidney-shaped, it should be understood that the screening element 43 and cavities 2 may be in any suitable shape for filtering the plastics melt flow. For example, the screening elements 43 and cavities 2 may be circular, square, or rectangular shaped.

Figure 2:
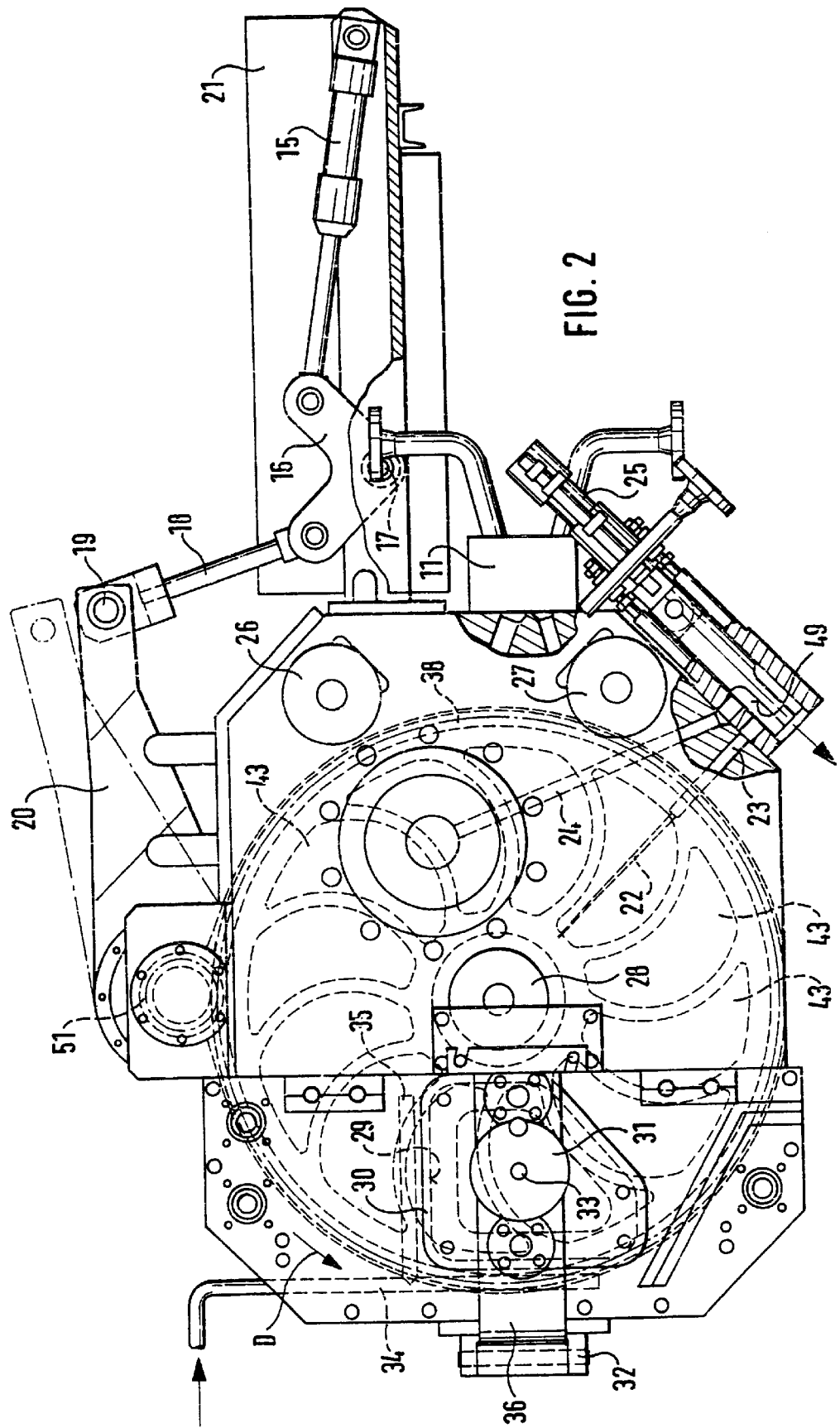
FIG. 2 is a sectional view of the filter device according to the present invention.
Figure 3:
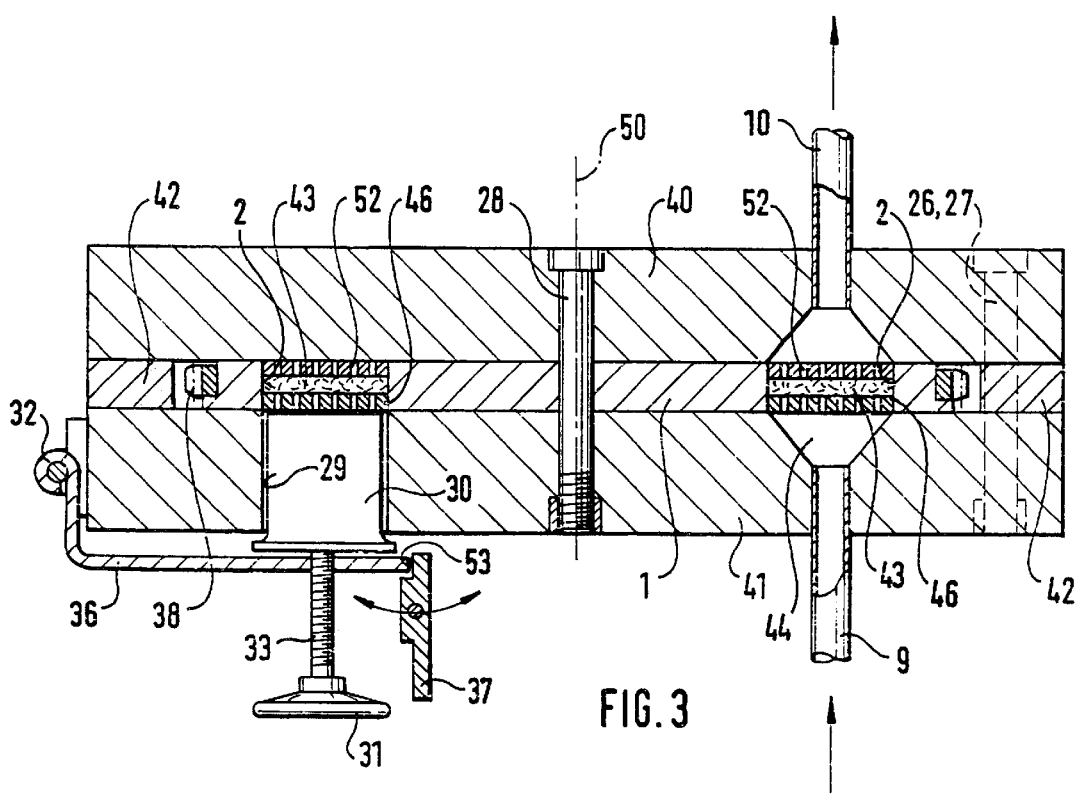
FIG. 3 is a side sectional view of the filter device according to the present invention.

Reference is now made to FIGS. 2 and 3. FIG. 2 shows a section through the filter device, the basic body of which, as illustrated in FIG. 3, includes two blocks 40, 41, which are spaced at a predetermined distance by spacer plates 42. Between the spacer plates 42 and the blocks 40, 41 is the filter wheel 1, which can rotate about a central spindle 50. The outer circumference of the filter wheel 1 is equipped with a toothed rim 38, via which the filter wheel 1 can be driven, as will be further described with reference to FIG. 2. The blocks 40, 41 are fastened by clamping bolts 26, 27, 28 (see FIG. 3), to enable a working pressure of up to about 50 bar or more during operation. The filter wheel 1 is sealed off from the blocks 40, 41 in the heatable housing of the filter device by seals (not shown), which may be, for example, metal seals. The plastics melt to be filtered is fed to the filter device via melt channel 44 which is formed in the front block 41. The melt channel 44 widens to a charging funnel as the plastics melt travels in the direction of the filter wheel 1. The filter wheel 1 has cavities 2 which receive, for example, preferably kidney-shaped screening elements 43. While the screening elements 43 are shown as being kidney-shaped, it should be understood that the screening elements 43 may be formed of any suitable shape. Downstream of the screening elements 43, in the direction of the plastics melt, is a collecting funnel. The filtered plastics melt passes into a discharge channel and into the melt outflow line 10. The screening elements 43 are preferably directed with their tips toward the central spindle 50 of the filter wheel 1, as illustrated in FIG. 1a. Preferably, there are three cavities 2, with their screening elements 43, present in the melt channel 44 as it widens into a funnel-shape at the input of the plastics melt into the filter wheel 1.

As illustrated in FIG. 2, the central clamping bolt 28 and the two clamping bolts 26, 27 of the filter device are to the right of the filter wheel 1. The kidney-shaped screening elements 43, which are formed in the cavities 2 along the pitch circle of the filter wheel 1, are illustrated by dashed lines. During operation of the filter, three screening elements 43 are in the effective range of the charging funnel of the melt channel 44, so that the three cavities, which are covered by the screening elements, are filled by the melt flowing in and, from there, the melt flows through the melt outflow line 10. After a period of time in operation, particles and contaminants filtered out of the melt begin to clog the screening elements, thereby increasing flow resistance through the filter and the pressure drop, $\Delta p$, across the filter device 1 increases. As soon as the pressure drop, $\Delta p$, exceeds a predetermined value, the filter disk 1 is turned counterclockwise by one or more divisions of the toothed rim in the direction of arrow D. The screening element 43, which is the upper element in the direction of rotation D, is, in this case, pivoted out of the charging funnel. The previously central screening element 43 remains in the effective range of the charging funnel and becomes the upper element, while the previously lower screening element becomes the central screening element and a fresh or cleaned screening element is pivoted into the range of the charging funnel as the lower screening element. Consequently, two screening elements 43, which are partially clogged, and a fresh screening element 43 are available for the operation of the filter. In this way, drastic pressure fluctuations during the filtration of the melt are avoided, as the pressure drops fluctuate to a lesser extent than, for example, if a completely clogged screening element is abruptly changed for a new or cleaned screening element.

Still with reference to FIG. 2, the step-by-step rotation of the filter wheel 1 is achieved by a drive piston 15, which is joined on a mounting plate 21. The mounting plate 21 is fastened to the housing of the filter device, preferably horizontally as shown. The drive piston 15 is connected to a pushing/pulling rod 18 by an angle-shaped rocker 16, which is pivotable about pivot pin 17. The pivot pin 17 of the rocker 16 is fastened to the mounting plate 21. The pulling/pushing rod 18 is joined at a pivot point 19 of a ratchet 20. The ratchet 20 drives a pinion 51 which meshes with the toothed rim 38 of the filter wheel 1. If the drive piston is extended, the ratchet 20 disengages from the pinion 51. If, on the other hand, the drive piston 15 is retracted, the ratchet 20 engages the pinion 51, which continues to turn the filter wheel 1 counterclockwise in the direction of the arrow D.

By fastening the drive piston 15 on a horizontal, U-profile-shaped mounting plate 21 it is ensured that, despite the high temperatures of the housing of the filter device, the thermal loading of the drive piston 15 is reduced to the extent that its serviceability is ensured.

As explained above, the degree of soiling of the screening elements 43 correlates to the pressure difference, $\Delta p$, occurring across the filter device. Furthermore, the pressure drop across the filter device correlates to the cleaning cycle for the screening elements 43. The step-by-step progressive turning of the filter wheel 1 brings fresh screening elements, or filter inserts, into the melt flow. The clogged screening elements are cleaned by a pulsed counterflow method outside the main melt flow after further turning of the filter wheel 1. A back-thrust throughflow may be used to clean the screening elements. The back-thrust method detaches the dirt particles accumulated in the screening element 43 and subsequently washes them out. Depending on the pore size of the screening elements 43, repeated cleaning of the filter inserts is possible. After several cleaning cycles, an exchange of the screening element is then necessary. Due to the high operating temperatures of the filter device, appropriate measures are required to avoid damage to the filter system and the plastics melt. This is because, due to the high temperatures, the oxidation of the plastics melt, which may include monomers, polymers or a combination thereof, preferably a monomer, presents a particular problem during the exchange of the screening elements. The exchange of the screening elements takes place via a closable removal/fitting opening 29 in the housing of the filter device. In the region of the removal/fitting opening 29 two feed nozzles 34, 35, are present which form right angles with respect to each other. The feed nozzles 34, 35 may be formed of tubes with circumferential holes. An inert gas, such as, for example, nitrogen is preferably fed through these T-shaped feed nozzles to produce a spatial homogeneous gas flow. Consequently, a gas curtain in front of the removal/fitting opening 29, is formed by the gas flow through to feed nozzles 34, 35. The gas flowing out of the nozzle openings of the T-shaped feed nozzles 34, 35 produces two overlapping gas veils or curtains, which extend at right angles with respect to each other and flow away via the outlet/inlet opening, without gas flowing into this opening. This makes it possible to carry out the exchange of the screening elements without the risk of oxidation of the plastics melt. The blowing of nitrogen into the opening 29 must be avoided, because intensive cooling of the filter wheel 1 and the screening elements would therefore take place. This cooling may then lead to the plastics melt solidifying. This may damage or destroy the screening elements.

A pivotable tilting device 36 is attached to the outer circumference of the housing of the filter device. The smaller leg of the tilting device 36, joined at a hinge 32, has a length smaller than the depth of the removal/fitting opening 29. The removal/fitting opening 29 is formed to receive a displacement block 30 and is located in the front block 41. The displacement block 30 is engaged with a spindle 33, which may be turned by a hand wheel 31. The longer leg of the tilting device 36 covers the removal/fitting opening during operation of the filter of the filter device. When a used screening element 43 is to be exchanged for a fresh screening element, the tilting device 36 is pivoted away from the filter housing about hinge 32. Contact with a closure control 37 in the filter device is interrupted and the closure control 37 indicates that the removal/fitting opening 29 has been opened. The closure control 37 is a pivotable lever, which has at the upper end a right-angled detent 53. The detent 53 bears against the outer edge of the tilting device 36. Instead of a mechanical closure control, it is also possible to use a monitoring sensor provided with an indicating lamp to indicate when the removal/fitting opening has been opened or closed.

As the displacement block is being removed, the feed nozzles 34, 35 are supplied with gas, such as, for example, nitrogen, which flows away via the removal/fitting opening 29, as described above. By turning the hand wheel 31, the displacement block 30 is extended out of the removal/fitting opening 29 by the spindle 33 so that the screening element 43 to be exchanged can be removed and replaced with a fresh screening element. Once the screening element has been changed, the displacement block is moved back into the removal/fitting opening 29. The supply of gas via the feed nozzles 34,35 is then switched off and the removal/fitting opening 29 is closed by pivoting-in the tilting device 36. The closed state is indicated by the closure control 37 in that, if the displacement block 30 has penetrated to an adequate depth into the removal/fitting opening 29, the closure control 37 is aligned parallel with the spindle 33 and, if displacement block 30 has penetrated to an inadequate depth, the closure control 37 protrudes obliquely away from the spindle 33. Screening elements are generally not replaced after each filtration cycle.

Before a screening element is exchanged, the screening element is backflushed to clean it of melt and adhering dirt particles. This is achieved by the plastics melt flowing in the discharge line 23a being subjected to pressure by the accelerator 13 as illustrated in FIG. 1. As can be seen from FIG. 2, the discharge line 23a is supplied with plastics melt via pump 11. The rear block 40 opens out into the backflushing slot 22, which preferably has a tapered conical shape. The shape of the backflushing slot 22 ensures a high backflushing pressure of the plastics melt flowing through the screening elements 43 to be cleaned in the backflushing direction. As a result, the plastics melt located in the cavity, and the dirt particles adhering to the screening element 43, are forced out and carried away through the melt return/discharge line 23b. In the position of the discharge piston 25 shown in FIG. 2, these residues are returned via return line 24 into the melt inflow line, (not shown in this figure) and filtered once again.

Machined into the discharge piston 25 is a recess 49, via which the lines 23b and 24 are in connection with each other. If the discharge piston 25 is extended, the recess 49 moves away from the line 24 and, as a result, interrupts the connection between the lines 23b and 24. Instead of connecting with line 24, the line 23b is connected directly to the disposal line 39, not shown in FIG. 2 (see FIG. 1). The flushed-out melt residues and dirt particles then pass directly into this disposal line 39. The discharge piston 25 thus performs the same function as the 3-way valve described with reference to FIG. 1.

Figure 4:
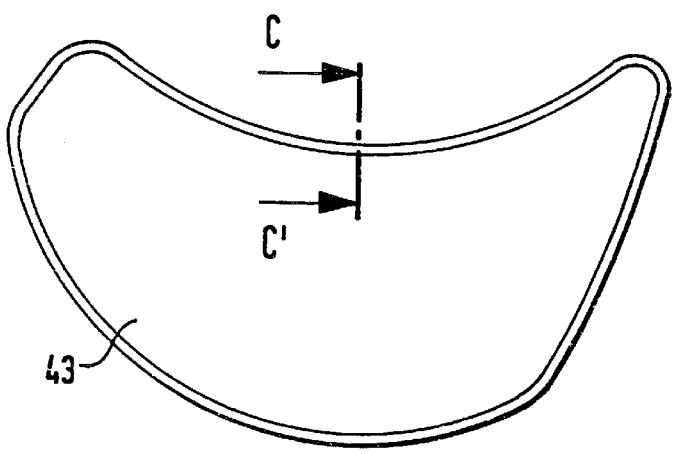
FIG. 4 is a plan view of a screening element of the filter device according to the present invention.

FIG. 4 shows a screening element 43, which lies in a cavity 2. The screening element 43 can include a plurality of filter layers, such as, for example five layers. In a preferred embodiment, the two outer filter layers each have a greater mesh size, for example of 630 and 1000 $\mu$m than the inner filter layers with a mesh size of 400 $\mu$m each. For the middle filter layer, the mesh size is of about 6 to about 40 $\mu$m, depending on the cleaning requirement. The preferred material is high-grade steel for the filter layers.

Figure 5:
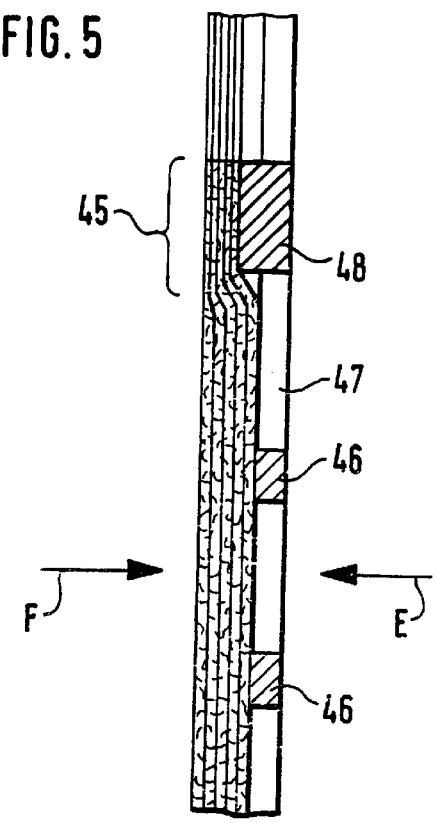
FIG. 5 is a sectional side view along the line of C–C' of the screening element according to FIG. 4.

As can be seen from FIG. 5, which is a view along the line C–C' of FIG. 4, the filter layers are pressed together at the outer edge to form an edge compression 45, which has a smaller thickness than the uncompressed filter layers. On the melt feed side in the direction of flushing or filtration there is, with respect to the screening element 43, a wall plate 46, which together with the screening element 43 forms a complete filter pack and serves as a mechanical support during the surge-like backflushing cleaning. The wall plate material is a cast high-grade steel with a hardened surface. A woven fabric of the wall plate 46 is a fabric with a mesh size of 1.4 mm for example and a wire diameter of 1 mm and is welded to the plate.

The arrow E in FIG. 5 indicates the direction of flushing or filtration and the arrow F indicates the direction of backflushing. The wall plate 46 has at its outer edge a web 48, which is shaped in such a way that it terminates flush with the edge compression 45 of the compressed filter layers. The cross section of the complete filter pack, including wall plate 46 and screening element, is generally rectangular throughout, so that the cavities 2 have a level surface area when the screening elements are inserted into the cavities.

Figure 6:
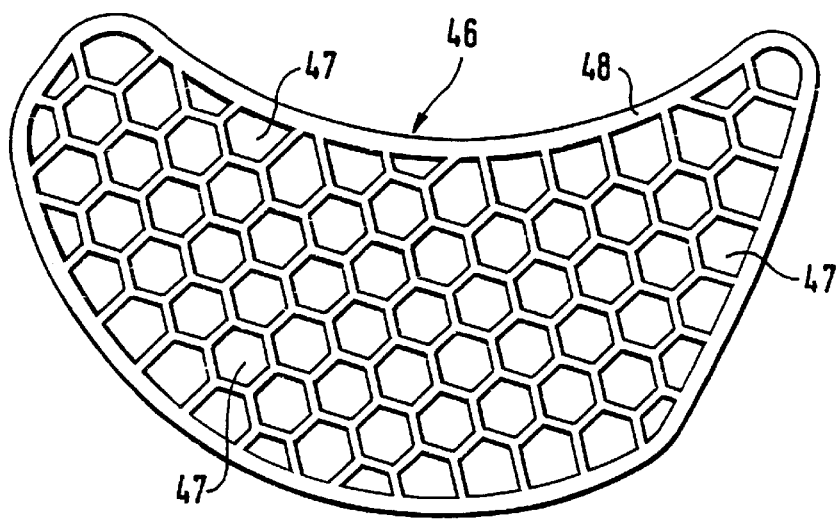
FIG. 6 illustrates a screening element according to FIG. 5.

Against the screening element 43 there may lie, for example, a coarse screen or a perforated plate 52, as can be illustrated from FIGS. 1 and 3. As FIG. 6 reveals, the wall plate 46 may have honeycomb-shaped openings 47.

German Patent Application No. 299 08 735.2, filed on May 18, 1999, including the specification, figures, and abstract, is expressly incorporated by reference in its entirety.

The specific filter device described above are but one of many filter devices that could be used within the scope of the present invention. Accordingly, the above description is only illustrative of preferred embodiments which can achieve one or more of the features and advantages of the present invention. It is not intended that the invention be limited to the embodiments described in detail herein. The invention is only limited by the scope of the following claims.

We claim:

1. A filter device for filtering plastics melts, comprising:
   a melt channel through which a plastics melt flows;
   an exchanging area;
   a filter wheel having a plurality of cavities therein, wherein said filter wheel pivots the plurality of cavities between said melt channel and said exchanging area;
   a plurality of screening elements covering said cavities in said filter wheel;
   a melt inflow line upstream of said filter wheel and a melt outflow line downstream of said filter wheel in fluid communication with said melt channel;
   a first pressure sensor arranged in said melt inflow line;
   a second pressure sensor arranged in said melt outflow line;
   a removal/fitting opening formed in said exchanging area of the filter device for exchanging fresh or cleaned screening elements for soiled screening elements;
   a melt return line which branches off from said melt outflow line and includes a pump and a first melt discharge line for transporting filtered plastics melt into a backflushing slot of the filter device to backflush said screening elements;
   an accelerator connected to said first melt discharge line for increasing pressure in said first melt discharge line for backflushing said screening elements; and
   a second melt return/discharge line, leading away from the filter device on the opposite side of the filter wheel from the backflushing slot, and a valve for selectively directing backflushed plastics melt to said melt inflow line or a disposal line.

2. The filter device according to claim 1, wherein the filter device has a first block and a second block, which are kept apart by a distance by spacer plates arranged in between said blocks, and wherein said exchanging area is formed in said first block.

3. The filter device according to claim 2, further comprising a removal/fitting opening for the screening elements formed in said exchanging area, said opening being closed by a displacement block which can be moved into and out of the removal/fitting opening by a manually actuable spindle.

4. The filter device according to claim 3, further comprising T-shaped feed nozzles having nozzle holes distributed around the circumference thereof and arranged above a longitudinal and transverse edge of said removal/fitting opening, said nozzles being aligned in such a way that gas flowing out of said nozzles forms two overlapping gas veils, which extend at right angles with respect to each other and flow away via the removal/fitting opening without gas flowing into this opening.

5. The filter device according to claim 4, further comprising a pivotable tilting device for closing the removal/fitting opening.

6. The filter device according to claim 5, further comprising a closure control for monitoring closing and opening positions of said pivotable tilting device.

7. The filter device according to claim 6, wherein the closure control is a pivotable lever which is arranged parallel to the spindle and further includes a detent which bears against the outer edge of the tilting device when the displacement block has entered to an adequate depth into the removal/fitting opening.

8. The filter device according to claim 5, wherein said tilting device is joined at a hinge and can be pivoted about said hinge to expose the removal/fitting opening.

9. The filter device according to claim 3, wherein, said displacement block is located in the removal/fitting opening and is engaged with the spindle, which can be actuated via a hand wheel in order to move the displacement block out of or into the removal/fitting opening.

10. The filter device according to claim 1, further comprising a drive piston connected via a rocker and a pulling/pushing rod to a ratchet, which drives a pinion which meshes with a toothed rim on the outer circumference of said filter wheel.

11. The filter device according to claim 1, wherein said screening elements include a multi-layer woven filter fabric.

12. The filter device according to claim 11, wherein the filter layers are compressed together and sealed at the outer edge to form an edge compression.

13. The filter device according to claim 11, wherein said multi-layer woven filter fabric includes at least one middle filter layer surrounded by at least one outer filter layer and at least one inner filter layer on respective sides of said middle filter layer.

14. The filter device according to claim 13, wherein the two outer filter layers of said screening elements have a greater pore width than the inner filter layer(s).

15. The filter device according to claim 13, wherein the middle layer(s) have a pore width of 6 to 40 $\mu$m.

16. The filter device according to claim 1, further comprising a wall plate having honeycomb-shaped openings arranged upstream of said screening elements in the filtering direction.

17. The filter device according to claim 16, wherein at the edge of the wall plate there is a web, which terminates flush with the edge compression of the compressed filter layers.

18. The filter device according to claim 17, wherein the screening elements and the wall plate are comprised in a filter pack and wherein the cross section of the filter pack comprising the wall plate and screening element is rectangular throughout.

19. The filter device according to claim 1, wherein said cavities have a kidney-shaped outline and a size such that three adjacent cavities at a time are exposed to the melt channel.

20. The filter device according to claim 19, wherein the screening elements have a kidney-shaped outline which is congruent with the outline of the cavities.

21. The filter device according to claim 1, wherein said melt channel has a widened funnel-shape where it contacts said filter wheel.

22. The filter device according to claim 1, wherein said filter wheel is pivoted when the pressure differential between said first pressure sensor and said second pressure sensor reaches a predetermined level.

* * * * *